(12) United States Patent
Volftsun et al.

(10) Patent No.: US 6,707,792 B1
(45) Date of Patent: Mar. 16, 2004

(54) OVERLOAD REDUCTION IN A COMMUNICATION SYSTEM

(75) Inventors: Lev Volftsun, Herndon, VA (US); Clay H. Neighbors, Reston, VA (US); Fred R. Rednor, Arlington, VA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/107,839

(22) Filed: Jun. 30, 1998

(51) Int. Cl.[7] ........................ H04L 12/66; H04L 12/28; H04J 3/22; H04M 7/00; G06F 9/00
(52) U.S. Cl. ................. 370/235; 370/352; 370/389; 370/467; 379/229; 379/265; 709/103; 709/310
(58) Field of Search .................. 370/235, 236, 370/230, 395, 410, 522, 545, 412, 351; 379/219, 220, 230, 279, 337; 709/103, 106, 207, 224, 310

(56) References Cited

U.S. PATENT DOCUMENTS

| | | | | |
|---|---|---|---|---|
| 4,511,762 A | * | 4/1985 | Stockdale | 379/279 |
| 4,564,725 A | * | 1/1986 | Daisenberger | 379/138 |
| 5,208,809 A | * | 5/1993 | Fergeson et al. | 370/545 |
| 5,325,426 A | * | 6/1994 | Held | 379/337 |
| 5,440,741 A | * | 8/1995 | Morales et al. | 709/103 |
| 5,450,483 A | * | 9/1995 | Williams | 379/112 |
| 5,754,786 A | * | 5/1998 | Diaz et al. | 395/200 |
| 5,793,771 A | | 8/1998 | Darland et al. | |
| 5,828,666 A | | 10/1998 | Focsaneanu et al. | |
| 5,878,224 A | * | 3/1999 | Smith | 709/224 |
| 5,889,762 A | * | 3/1999 | Pajuvirta et al. | 370/230 |
| 5,933,490 A | | 8/1999 | White et al. | |
| 5,987,118 A | | 11/1999 | Dickerman et al. | |
| 6,018,519 A | * | 1/2000 | Ginzboorg | 370/236 |
| 6,021,126 A | | 2/2000 | White et al. | |
| 6,151,390 A | * | 11/2000 | Volftsun et al. | 379/229 |
| 6,205,212 B1 | * | 3/2001 | Swale | 379/133 |
| 6,212,188 B1 | * | 4/2001 | Rochberger et al. | 370/395 |
| 6,363,052 B1 | * | 3/2002 | Hosein | 370/230 |
| 6,405,045 B1 | * | 6/2002 | Choi et al. | 455/453 |

* cited by examiner

Primary Examiner—Steven H. D Nguyen
Assistant Examiner—M. Phan
(74) Attorney, Agent, or Firm—Hickman Palermo Truong & Becker LLP

(57) ABSTRACT

A method and apparatus for reducing overload conditions of a node of communication system is disclosed. One or more pairs of predefined upper and lower overload threshold values are stored. A rejection proportion value is stored in association with each of the pairs of overload threshold values. Messages arrive at the node and are processed by it. The current processing load or saturation level of the node is continuously measured in real time. The current saturation level is associated with one of the predefined pairs of overload threshold values. The node rejects a number of messages equal to the rejection proportion value that is associated with the overload threshold values that correspond to the current saturation level. Preferably, only call initialization messages, such as call setup messages or initial address messages, are rejected. Accordingly, the node rejects those messages which, if acknowledged, would lead to the creation and transmission of numerous other messages and would worsen the overload condition. The node may be a call processor in a telecommunication network, such as a universal protocol converter.

19 Claims, 5 Drawing Sheets

OVERLOAD REDUCTION IN A COMMUNICATION SYSTEM

FIELD OF THE INVENTION

The present invention relates generally to telecommunications. The invention relates more specifically to apparatus and methods for reducing or handling overload conditions experienced by a call processor in a telecommunications network.

BACKGROUND OF THE INVENTION

Communication networks generally comprise nodes that are connected externally to terminal resources and connected internally to each other by network links. The network enables messages to be communicated between remote terminal resources and network nodes by transmitting a message from an originating terminal resource to a first network node, associated with the originating terminal resource, from which it is transmitted to a second network node, associated with the terminating terminal resource. Finally, the message is transmitted from the second network node to the terminating terminal resource. Examples of communication networks of this type are the public switched telephone network, internetworks, and the global, packet-switched network known as the Internet.

In this context, "network node" means an addressable device in the network that processes information transmitted through the network by, for example, providing switching, routing, or converting capabilities. A network node stores incoming messages as they are received in a message queue, from which they are removed when processed. Examples of network nodes include switches, routers, call processors, and protocol converters.

One measurement of the efficiency of the system is its throughput. Network throughput is a measure of the volume of incoming messages that are successfully processed by network nodes over time. In general, system throughput increases as the number of messages received increases. However, each network and each network node has a maximum "load," or capacity of work that it can successfully perform. Generally, as long as the actual load on a system or system component stays below its maximum load, the system throughput increases as the actual load increases.

When the actual load exceeds the maximum load, a system "overload" occurs. In an overload state, the message queues of the network nodes are at or are approaching capacity, and without an overload control strategy, further messages received by the nodes are randomly rejected or erroneously processed. For example, a protocol converter that is subject to overload conditions will receive more messages or requests for protocol conversion than it can process or output at a given time. In this condition, the protocol converter will fail to recognize and correctly process an arbitrary number of input messages. As a result, communications cannot proceed through the network at that node.

Other unpredictable results can occur during overload conditions. For example, in some networks, messages are time division multiplexed onto one or more channels linking the network nodes and terminal resources, and transmitted through the network as a plurality of packets. If individual packets are lost during an overload state, an originating node must generally re-send the entire message, even if other packets of the message were successfully transmitted. As a result, overload conditions can cause a dramatic decrease in system throughput.

When an overload condition occurs at certain types of call processors, the overload conditions can have a detrimental cascading effect on system operation. For example, one type of network node is a universal protocol converter of the type described in U.S. Pat. No. 6,111,893, entitled UNIVERSAL PROTOCOL CONVERTER. In one aspect of operation, a universal protocol converter is connected logically between a first network and a second network, in which communication protocols used by the first network and the second network are incompatible. The universal protocol converter receives, among other things, incoming messages that request a call to be established, and messages that are part of existing calls. If the universal protocol converter is in an overload condition, there is a chance that it will receive and successfully process a call setup message, and then fail to successfully process later messages that relate to that call. As a result, calls are unnecessarily set up, creating a further undesirable load on the system.

It is apparent that a critical attribute of a successful and practical communication network is the ability to handle overload conditions. In particular, there is a need in network nodes for a mechanism that can recognize overload conditions and prevent unpredictable consequences from occurring.

There is also a need, in a network node such as a call processor or universal protocol converter, for a mechanism that can recognize overload conditions, identify call setup messages that are received during an overload condition, and prevent the establishment of new calls until the overload condition subsides.

SUMMARY OF THE INVENTION

The foregoing needs, and other needs and objectives that will become apparent from the description herein, are achieved by the present invention, which comprises, in one aspect, a method for reducing an overload condition at a node of a communication system, comprising the steps of storing a plurality of upper and lower overload level values in a memory, wherein each upper and lower overload level value corresponds to a saturation condition of the node; storing a plurality of rejection proportion values in the memory, wherein each rejection threshold value is associated with one of the overload level values; determining the current saturation level of the node; and rejecting a quantity of messages received at the node equal to the rejection proportion value associated with one of the upper and lower overload level values that corresponds to the current saturation level.

One feature of this aspect is the steps of identifying a message type of the message received at the node; determining whether the message type is a first type that can be rejected or a second type that cannot be rejected; and rejecting only messages of the first type. Another feature is that the step of rejecting comprises the step of rejecting every nth call initialization message received at the node, in which n is a rejection value associated with an overload level value that is exceeded. A related feature is that the step of rejecting comprises the step of rejecting every nth initial address message received at the node, in which n is a rejection value associated with an overload level value that is exceeded.

According to another feature, the node is a message queue of a call processor. Still another feature is that the step of storing a plurality of upper and lower overload level values further comprises the steps of storing a plurality of pairs of upper and lower overload level values in a memory, wherein each pair of upper and lower overload level values corresponds to a successively greater saturation condition of the node. A related feature is that the step of storing a plurality of overload level values further comprises the step of storing an upper overload level threshold value and a lower overload level threshold value in association with each of the plurality of overload level values.

Another feature is that the step of storing a plurality of overload level values further comprises the step of storing an upper overload level threshold value and a lower overload level threshold value in association with each of the plurality of overload level values, in which the upper overload level threshold value of a lesser overload level value slightly overlaps the lower overload level threshold value of a higher overload level value, whereby such overlap dampens behavior of the method.

According to still another feature, the step of rejecting comprises the steps of receiving a call initialization message that requests establishment of a new call; and sending a responsive message to the call initialization message, whereby the responsive message terminates the new call in an orderly way. In another feature, the node is a call processor and the call initialization messages represent requests to the call processor to process a new call. In an alternative, the node is a universal protocol converter.

A related feature further involves the steps of receiving the message at an interface having a message queue; determining a current saturation level of the message queue; and storing the message in the message queue when the message is not rejected. Still another feature involves the steps of storing a rejection threshold value m in the memory in association with a loading level of a processor of the call processor; receiving one or more messages from the message queue at the processor; and rejecting every mth message received at the processor when the loading level of the processor exceeds a predetermined maximum loading level. In one alternative, the step of rejecting comprises the step of rejecting every mth call initialization message received at the processor when the loading level of the processor exceeds the predetermined maximum loading level.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A communication system capable of handling overload and a method for handling overload in a communication system is described. In the following description, for purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview of Operational Context

Figure 1:
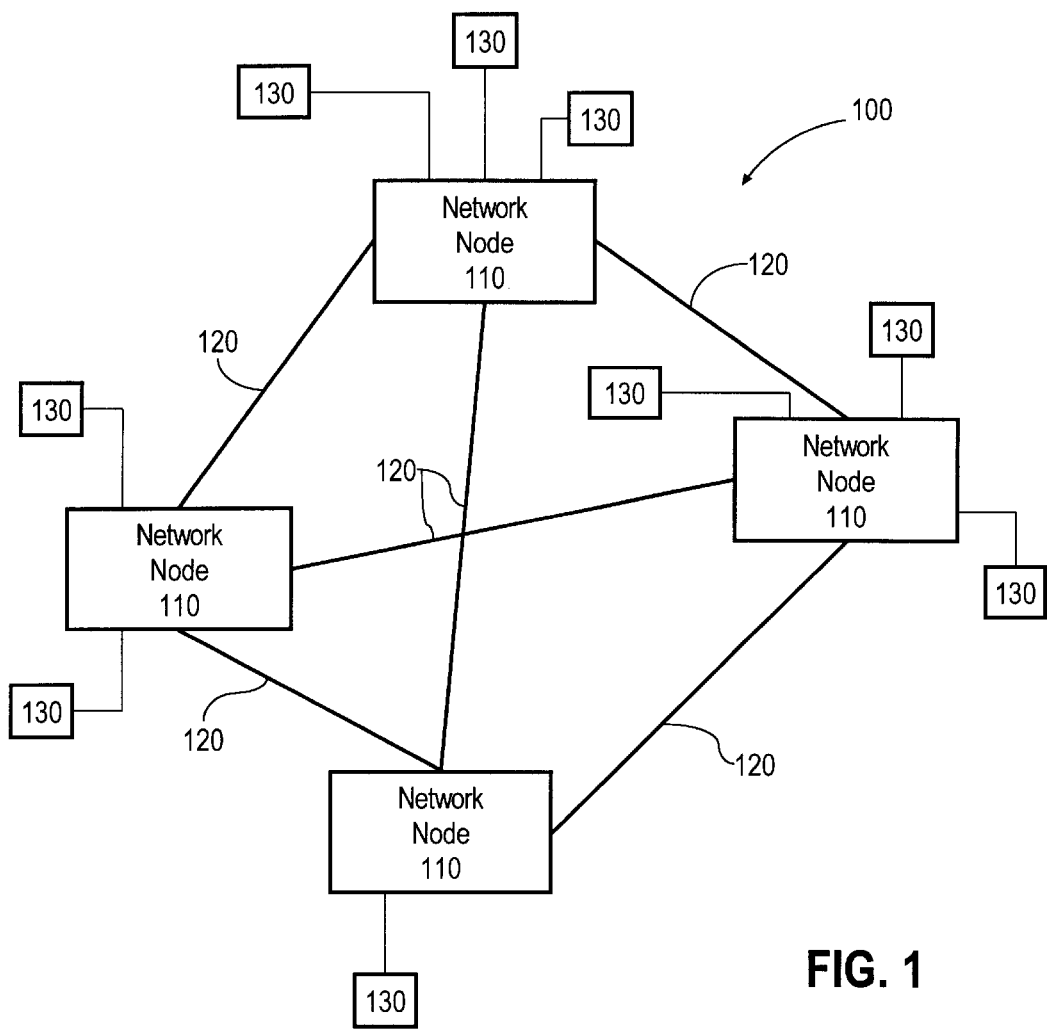
FIG. 1 is a block diagram of a communication system.

FIG. 1 is a block diagram of a communication system 100 comprising a plurality of network nodes 110 that are interconnected by network links 120. Each network node 110 is a device that is addressable using the network and which processes messages transmitted through the network. Functions of the nodes include, for example, switching, routing, serving as a gateway or firewall, or converting the format of network messages among different protocols. An example of a network node is the protocol conversion system disclosed in U.S. Pat. No. 6,111,893, entitled UNIVERSAL PROTOCOL CONVERSION and commonly assigned to the assignee of the present application.

Additionally, each network node 110 may be connected to one or more terminal resources 130 or end stations. Each terminal resource 130 or end station may be, for example, a telephone, voice messaging system, private branch exchange (PBX), personal computer, server, workstation, printer, local area network, local telephone network, virtual private network, or other sub-network.

The network links 120 carry messages between network nodes 110 according to an agreed-upon protocol. The network links 120 may comprise one or more cables, wireless links, satellite links, or any other means for communicating data from one point to another. The network links 120 may operate according to any suitable transport protocol, e.g., Common Channel Signaling (CCS) System 7, or TCP/IP. The communication system 100 itself may be a telephone call signaling system network such as the public switched telephone network. Alternatively, the communication system 100 is a data network such as a local area network, wide area network, or the global packet-switched network known as the Internet. Messages are transmitted through the network having form and content that vary depending on the network and its uses and applications.

In a preferred embodiment described herein, the communication system 100 is a telephone signaling system network that carries call setup and call signaling information. The call information may be carried in the network in a manner integrated with voice traffic, using in-band signaling protocols, or separate from voice traffic using out-of-band protocols. The call information includes messages for call initialization or call initiation, call progress and call setup messages, messages containing substantive content of active calls, and other network management commands or data. The type of a message is generally identified in a message header, which also includes information such as identifiers of the message's origin and destination, and a unique message identifier or sequence number.

In one mode of operation, call initialization messages normally lead to the exchange of other messages related to a call that is sought to be established by the call initialization message. In this context, "call initialization message" refers to any message sent from an originating network node to a destination network node that requests the destination node to set up or process a new call. Examples of call initialization messages include Initial Address Messages (IAMs), Setup messages in the Q.931 protocol, and "?" messages in the DPNSS protocol. For example, in response to a call initialization message, a network node 110 such as a telephone switching system or protocol converter normally exchanges numerous other messages with the origin of the initialization message. The numerous other messages involve obtaining information describing the called party and the calling party, trunk requirements, routing requirements, and other information, as well as voice traffic when the call becomes active. When the call is released or terminated by a party, still other messages are exchanged relating to release and termination. As a result, when acknowledged, a call initialization message or call initiation message can lead to creation of a significant number of other messages.

The network nodes 110 may be implemented using a computer system 100 such as that illustrated in FIG. 4 and which is described further below. As such, the communication interface 418 may include one or more I/O cards, and the network link 420 may include network links 120 as well as links to terminal resources 130 as shown in FIG. 1. The processing functions of the nodes are performed by the processor 404, which may include one or more processors. The network nodes 110 may also be a universal protocol converter of the type disclosed in the above-referenced patent.

Network Nodes

Figure 2:
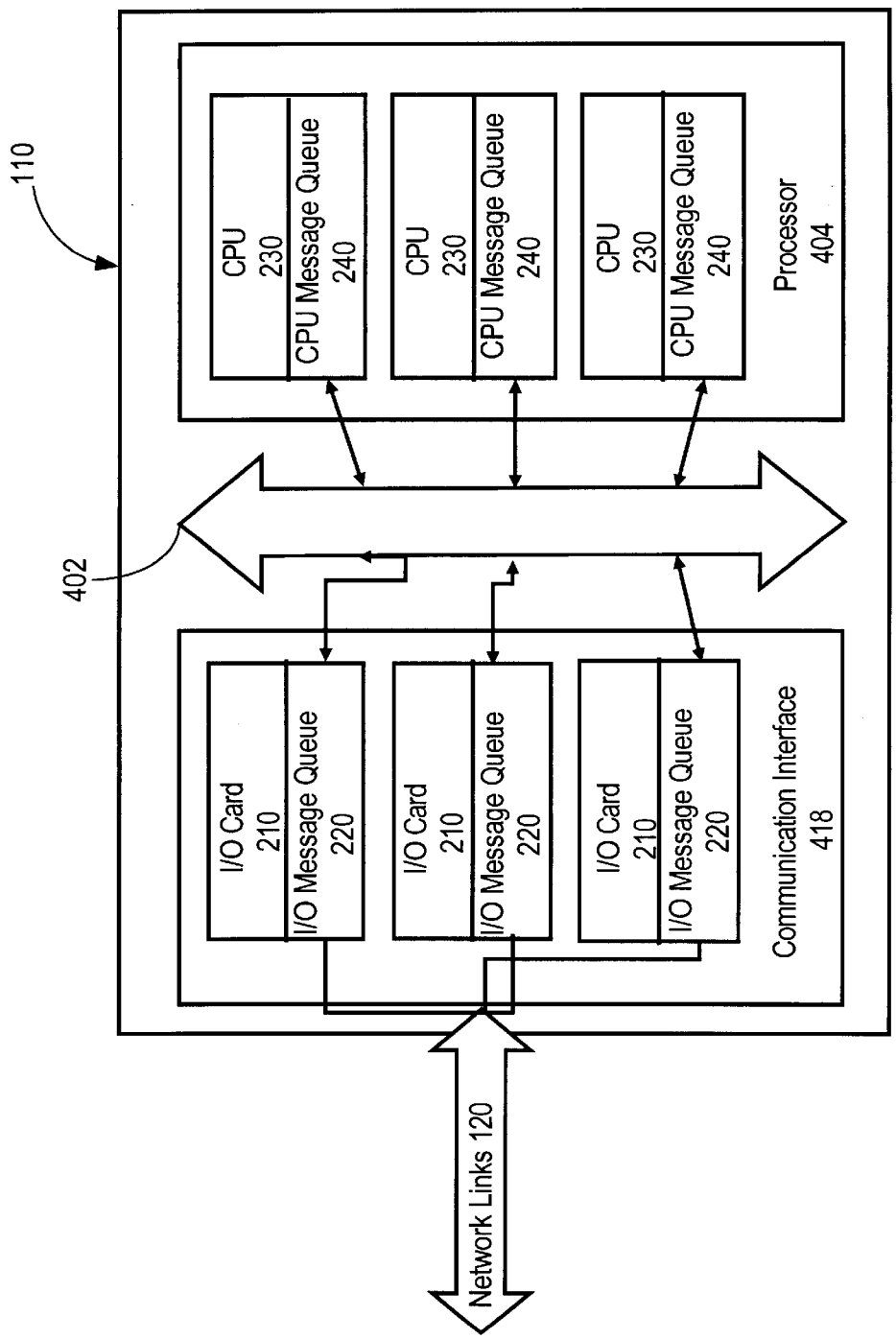
FIG. 2 is a functional block diagram of a network node.

FIG. 2 is a block diagram of an exemplary network node 110. As shown, the communication interface 418 includes a plurality of input/output interfaces 210 for receiving incoming messages received over the network links 120. Each interface 210 has an associated message queue 220 for storing received messages before processor 404 processes the messages.

When processor 404 is ready to process a message, one of the messages is removed from the message queue 220 and transmitted via the bus 402 to a central processing unit (CPU) 230 of the processor. The packet is again stored, this time in a processor message queue 240, until the processing unit actually processes the packet.

Thus, in this configuration, two structures are potentially subject to overloading: the message queues; and the processor. Overloading in a message queue occurs when the rate at which new messages are added to a message queue exceeds the rate at which the processor can remove messages from the message queue or effectively process them, on average, so that the queue begins to lengthen. Overloading in the processor occurs when messages arrive in the processor message queue 240 faster than the processor can remove the messages from that queue and process the messages. Overloading may also be said to occur when the receiving processor cannot respond or acknowledge messages quickly enough. Under these conditions, the system sending the message will experience a timeout, and will generally re-send the message. This tends to exacerbate the overload condition on the receiving system. Further, without an overload strategy in place, network nodes 110 may randomly reject or erroneously process incoming message packets.

Overload Handling

According to the preferred embodiment, when an overload state exists, the receiving system selectively responds to incoming messages that request a new call by responding in a way that terminates the new call. The number of messages subject to such response increases in a graduated manner depending on the extent of the overload state. In this document, the term "reject," with references to call signaling messages, is means carrying out the steps of receiving an incoming message that requests a new call, and responding with a message that terminates the new call in an orderly way. In effect, the new call is rejected.

The extent of overloading can be measured by various criteria. In the preferred embodiment, overloading is measured based on a percentage of maximum capacity at a given time. Capacity can be measured at various levels, including the overall capacity of the entire system, the capacity of a single node in the system network, or the capacity of a single processor or message queue within a network node. Capacity can also be measured in different terms, including the number of calls being handled at any of these levels, the amount of data waiting to be processed, or the number of messages stored in a message queue. Capacity can be measured at the communication interface 418, message queues 220, or processor 404. Capacity may be measured at any combination thereof, such as at both the message queues 220 and processor 404.

In the preferred embodiment, capacity is measured in terms of the storage capacity of the message queues 220 of the communication interface 418 with respect to their total storage capacity. Thus, the length of a message queue or processor queue may be used to indirectly forecast or estimate the load on the associated processor. It is not necessary to measure CPU utilization or the message arrival rate directly. Queue length tends to increase in proportion to the message arrival rate, and also increases in proportion to CPU utilization. In this embodiment, the queue length measurement forms part of a feedback loop. The amount of useful work that can be done is maximized by selectively trimming the queue under overload conditions, so that the receiving system reaches a dynamic equilibrium.

The extent of an overload is also called "saturation" or "saturation level." Messages requesting new calls are given a response that terminates the new call, and the number of messages given such response increases in a graduated manner depending on the current level of saturation. In this particular embodiment, overloading levels correspond to ranges of capacity used. Each overloading level corresponds to a successively greater amount of capacity in use or a successively greater amount of saturation.

For example, a first overload level corresponds to operation of a node at a first amount of capacity. At the first overload level, no overload state exists and no incoming messages are rejected. At a second overload level, the node is operating at a higher amount of capacity, and n % of the incoming messages are rejected. At a third overload level, m % of the incoming messages are rejected. The values of n and m may be called "rejection proportions", and generally they are integer values where m>n. There may be other overload levels, and the particular values of n and m are not critical. The values of n and m also may be expressed in non-percentage form to achieve the same function and result. For example, at the second overload value, for a rejection value of n, every nth message is rejected. In this case, successive values are less in value.

Each overload level has an upper and lower overload level threshold value. For example, the lower overload level threshold value of the first overload level is generally "0" or 0%, and the upper overload level threshold value represents the point at which an overload state is first recognized, such as 50% of capacity, 55%, or any other desired ceiling value. The lower overload level threshold value of the second overload level is selected to be slightly less than the upper overload level threshold value of the first overload level, so that successive overload levels overlap in capacity coverage. For example, if the first overload level represents 0% to 50% of message queue capacity or processor load, then the second overload level represents 40% capacity or load to some other upper bound. An overlapped arrangement prevents the system from cycling among overload levels as the queue length changes. Preferably, the upper and lower overload level threshold values are separated widely enough to avoid such rapid cycling to thereby provide a dampening effect.

In the preferred embodiment, only messages that are call initialization messages are rejected. Thus, in the preferred embodiment, at the second overload level, n % of call initiation messages are rejected. At a third overload level, m % of call initiation messages are rejected. An important aspect of the preferred embodiment involves structure and functions based upon the recognition that rejecting call initiation messages can result in a significant reduction in overloading. The reduction occurs because a rejected call initiation message prevents an originating device from generating numerous other related messages involved in setting up a call. Thus, rejecting call initiation messages, or responding to such messages in a way that causes immediate termination of the requested new call, stops a significant load of message traffic before it starts.

Figure 3A:
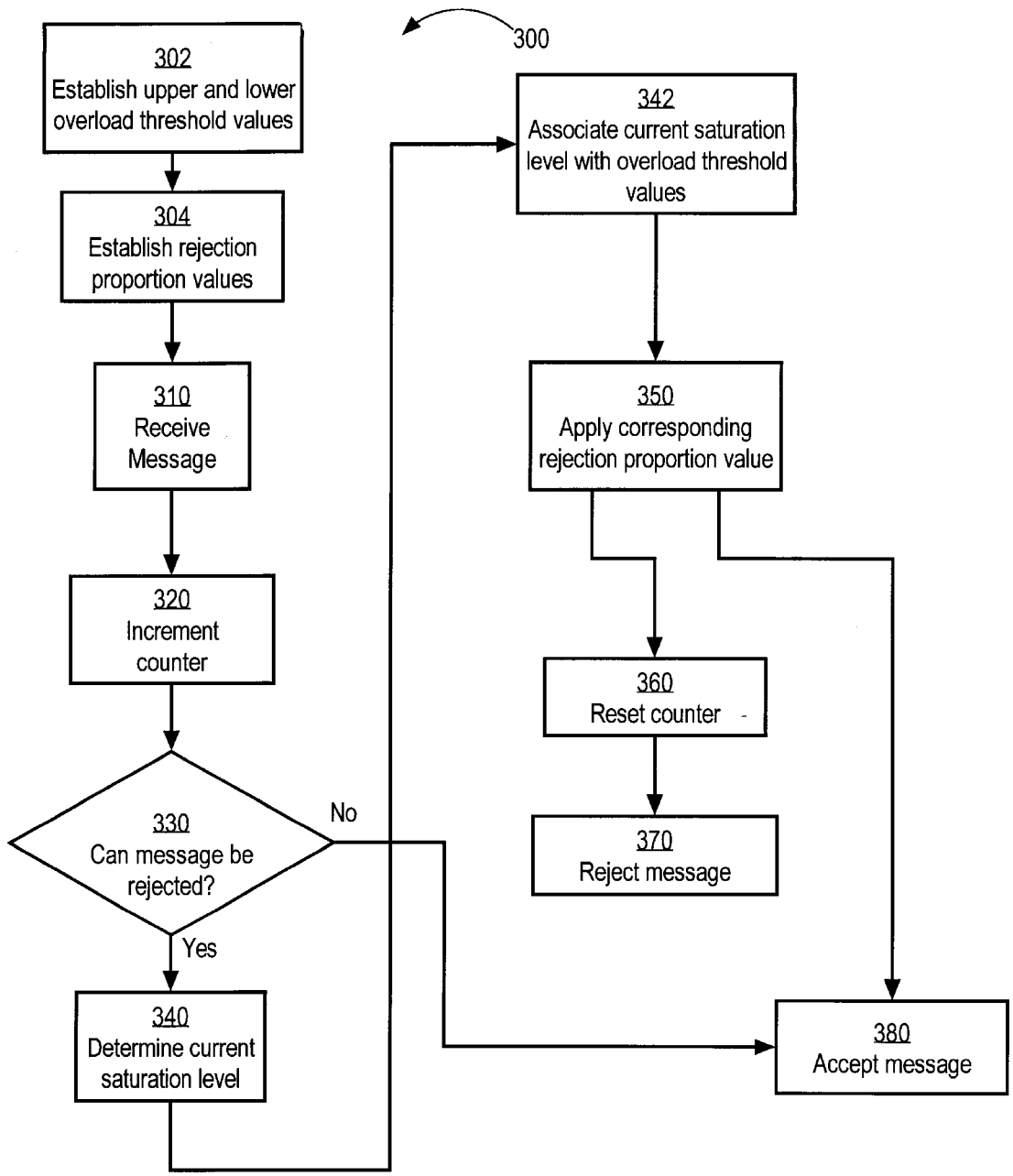
FIG. 3A is a flow diagram of one embodiment of a method for handling overload in a communication system.

FIG. 3A is a flow diagram 300 of a method for handling overload in a communication system. Block 302 involves the step of establishing a plurality of overload level threshold values. Block 304 involves the step of establishing rejection proportion values. In the preferred embodiment, in the step of block 302, four overload levels are established. By way of example, in one embodiment, a first level of capacity corresponds to the message queues 220 being filled in a range of 0–50% of maximum capacity. A second level of capacity corresponds to a range of 40%–60% of maximum capacity. A third level of capacity corresponds to a range of 50% to 70% of maximum capacity. A fourth level corresponds to a range of 60% to 100% of capacity. The specific overload capacity levels given above are merely exemplary, and may be varied widely in other embodiments. While the node is at the first level, no overload state exists and none of the incoming messages are rejected. At the second overload level, the rejection proportion value is 20% such that every fifth ($5^{th}$) incoming message is rejected. At the third level, the rejection proportion value is 50% such that every second ($2^{nd}$) incoming message is rejected. At the fourth level, the rejection proportion value is 100% such that every incoming message is rejected. Block 302 may also involve establishing a plurality of pairs of upper and lower overload threshold values rather than a plurality of levels.

Each network node 10 stores and maintains a counter that is incremented each time a new message is received. As shown in FIG. 3A, block 310, a message is received by a network node 110. In response, as shown in block 320, node 110 increments its counter.

When network node 110 is operating in an overload state, incoming messages are inevitably rejected, ignored ("dropped on the floor"), or unsuccessfully processed in some manner. The effect on system throughput of failing to successfully process messages varies depending on a number of factors, including the percentage of messages that fail as well as the type of messages that fail. For example, because a message transaction may comprise a plurality of packets or related messages, failure to process one message can result in the entire message having to be reprocessed. In contrast, rejection of a call initialization message does not require reprocessing of any previously processed packets. The effects of rejecting or losing other message types such as network management commands or data will vary depending on the network.

In systems without an overload handling strategy, messages or message packets are randomly lost, ignored, or not processed without regard to their type. In contrast, in the preferred embodiment, message type is evaluated, and messages are strategically selected according to whether they can be rejected when the communication system is in an overload state. In this embodiment, for example, messages have several different types, but the only message type that is intentionally rejected is call initialization messages. Rejecting this type of message does not require reprocessing of previously processed packets, which is highly inefficient. Also, rejecting a call initialization message prevents the originating network node from sending further messages in response to acknowledgment of the call initialization message, which reduces the future load to be processed by the system. In the context of voice communication systems, rejecting call initialization requests precludes a new call from being connected, which is generally preferable to affecting the quality of ongoing calls or causing calls to be disconnected.

Message content is never intentionally rejected by the preferred method because, as noted above, losing packets of ongoing messages can require reprocessing of other packets of the message that have already been successfully processed and can cause severe degradation of the quality of the ongoing call. Network management packets are similarly not rejected, as network management functions generally must be performed even when the system is in an overload state.

As shown in block 330, when a message is received in a network node 110, the type of the message is evaluated to determine whether the message can be rejected. In one embodiment, block 310 involves receiving a message at an interface 210 of the communication interface 418. In this embodiment, before the interface 210 stores the incoming message in its message queue 220, the interface evaluates the type of the message. If the message type is not one that can be rejected, as tested in block 330, the message is accepted, as shown in block 380. In one embodiment, in block 380 the interface 210 accepts the message and stores the message in a message queue 220.

If the message type is one that can be rejected, then as shown in block 340, the current saturation level of the system is determined. In one embodiment, network node 110 determines the current saturation level based on total system capacity to determine whether an overload state exists. For example, in one embodiment, the current saturation level is based on the percentage of message queue capacity currently being used. In other embodiments, block 340 may involve the steps of determining current processor load as a percentage of total processing capacity.

In block 342, the current overload level is associated with one of the pairs of overload level threshold values that were established in block 302 and with a rejection proportion value that was established in block 304 that corresponds to the associated pair. The result of such association is to determine the current overload level and the responsive action that needs to be taken, if any.

In block 350, the rejection proportion value corresponding to the associated pair of overload level threshold values is applied to the current message. For example, if the rejection proportion value is "0", then control is passed to block 380, and the message is accepted. In an embodiment, block 380 involves storing the message in the I/O message queue 220.

If the rejection proportion value is greater than "0", e.g., a percentage value, then corrective action is needed to reduce overload. Accordingly, in block 350 the value of the counter is compared, directly or indirectly, to the rejection proportion value that represents whether the current message is to be rejected. For example, if the second overload level has been reached and at the second overload level, 20% of all call setup messages or every fifth (5$^{th}$) incoming call setup message is rejected, then the counter may be compared to the value "5".

If the counter is equal to or greater than the rejection value, then in block 360, the counter is reset to zero ("0"), and in block 370, the message is rejected. The counter can be greater than the rejection threshold value when, for example, the overload level when a message X is received is higher than the overload level when the packet X-1 was received. The counter can also be greater than the rejection threshold value when a number of consecutively received messages of types that cannot be rejected equals or exceeds the threshold. Preferably, the system checks the current overload level rather than whether a particular overload level is reached. The overload level may increase, or it may decrease dynamically with load.

Variations of the embodiment described are possible and are contemplated. For example, the overload handling method may reject messages at the communication interface 418 of FIG. 2. Alternatively, the method can be implemented to reject messages at the processor 404. In this embodiment, CPU 230 determines whether to accept a message into their CPU message queues 240. As another alternative, the method can be implemented to reject messages at both the communication interface 418 and processor 404. For example, in this embodiment, interface 418 and processor 404 maintaining separate counters and establishing predetermined saturation levels and thresholds as may be appropriate for specific communication systems.

Figure 3B:
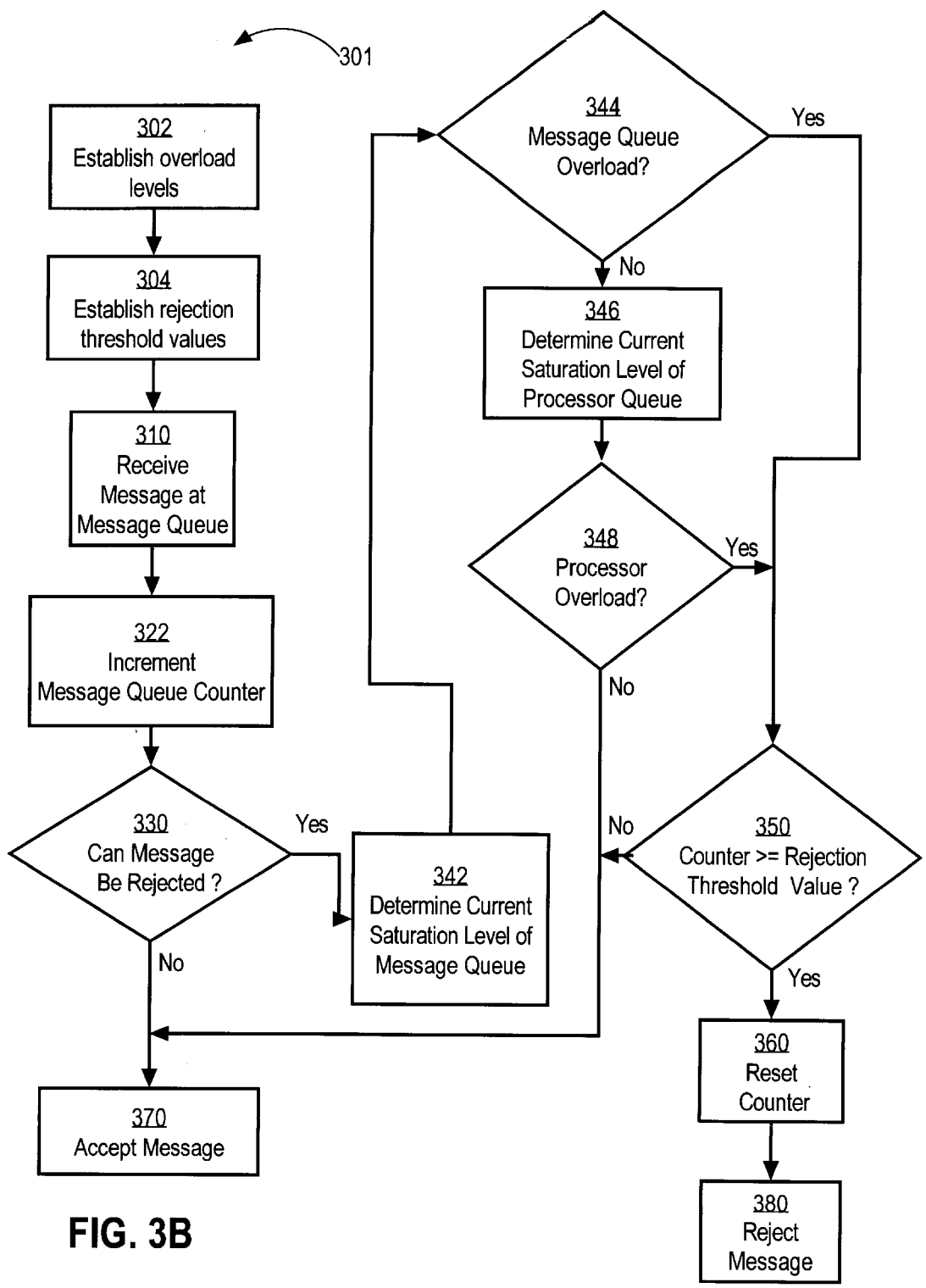
FIG. 3B is a flow diagram of another embodiment of a method for handling overload in a communication system.

Other variations may include different methods of determining overload levels. As noted above, these variations may include determining saturation or loading at different levels, including at an overall system level, at the node level (as described above), or at lower levels, such as at individual I/O message queues or individual CPU message queues. FIG. 3B is a flow diagram 301 of an embodiment of a method for handling overload in a communication system, in which overload is tested and addressed at both a message queue and a processor queue. The steps of block 302 and block 304 are the same as described above in connection with FIG. 3A. As shown in block 311, a message is received at a message queue. For example, block 311 may involve receiving a message at one of the I/O message queues 220. A message counter is associated with each message queue. As shown by block 322, when a message is received at a message queue, the counter associated with that message queue is incremented. Thus, each message queue counter maintains a running total of messages that have been received in a particular message queue.

As shown by block 330, when a message arrives at a message queue, the message type is examined to determine whether the message can be rejected if the queue is full. Block 330 may involve, for example, determining whether the message is a call initialization message, call setup message, etc.

If the message is of a type that cannot be rejected, then at block 380 the message is accepted. If it is determined at block 330 that the message is of a type that can be rejected, then at block 341 the current saturation level of the message queue is determined.

At block 344, it is determined whether the message queue is overloaded based on its current saturation level. If it is not, then at block 346 the current saturation level of the processor queue is determined. At block 348 it is determined whether the processor is overloaded based on its current saturation level. If it is not, the process returns to block 380 where the message is accepted.

Returning to block 344, if the message queue is overloaded, then at block 351 it is determined whether the message queue counter is greater than or equal to the rejection threshold value associated with the pertinent overload level. If it is not, the process returns to block 380 where the message is accepted. If it is, then at block 360 the counter is reset and at block 370 the message is rejected.

Other embodiments are possible and are contemplated. For example, saturation can be determined based on different criteria. The level of saturation is generally reflected in criteria including the current capacity on individual CPUs or all CPUs of the node processor 404. Additional criteria are likely to exist depending on the nature of specific communication systems. Additionally, the threshold values may also be varied depending on the needs of specific systems.

Hardware Overview

Figure 4:
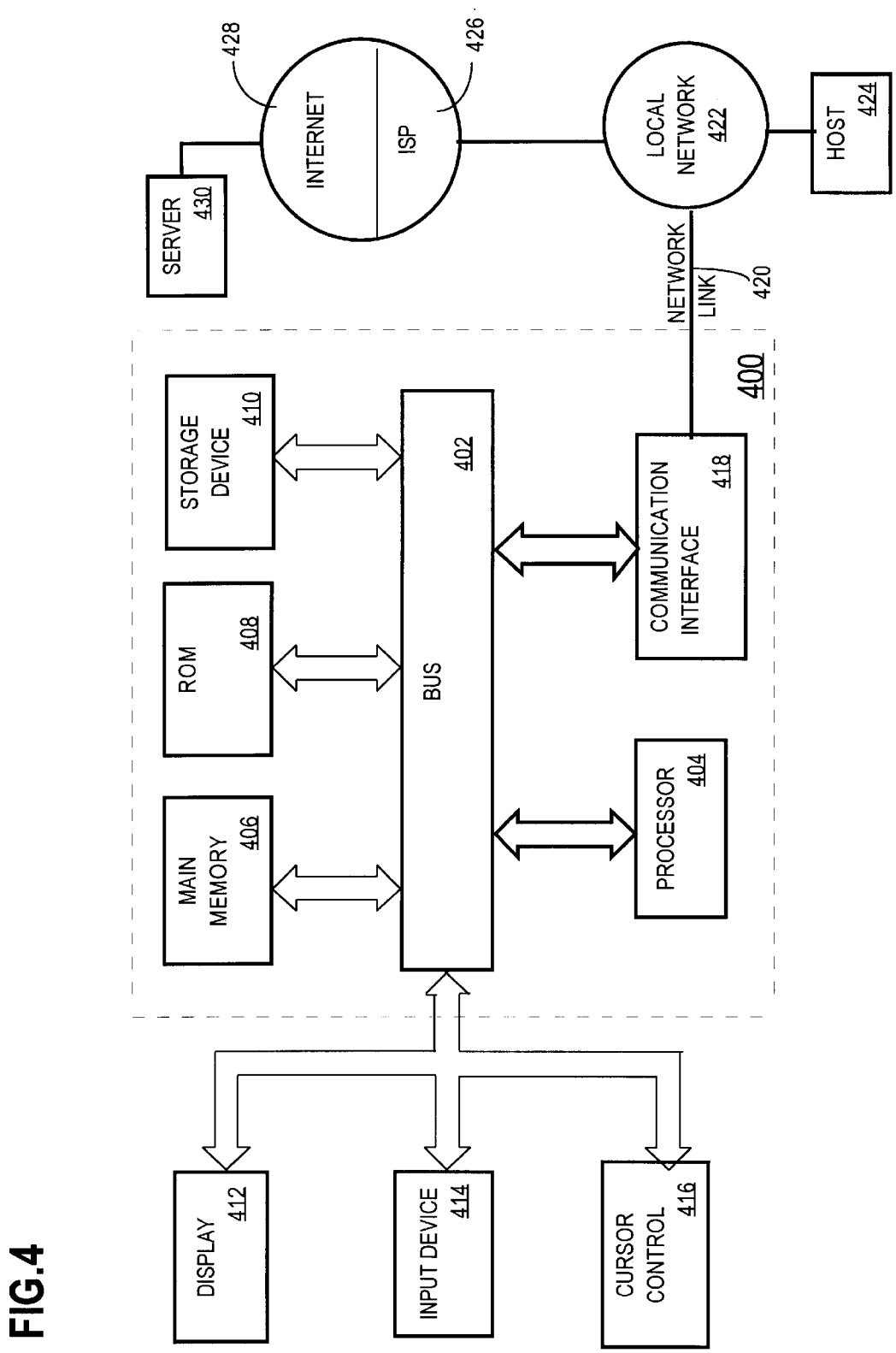
FIG. 4 is a block diagram of a computer system that may be used in the implementation of the invention.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for handling overload in a call processor or other network node. According to one embodiment of the invention, overload handling is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for overload handling as described herein.

The received code may be executed by processor 404 as it is received, and/or stored in storage device 410, or other non-volatile storage for later execution. In this manner, computer system 400 may obtain application code in the form of a carrier wave.

Variations, Extensions

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for reducing an overload condition at a node of a communication system, comprising the steps of:

storing a plurality of upper and lower overload level values in a memory, wherein each upper and lower overload level value corresponds to a saturation condition of the node, and wherein the storing includes storing an upper overload level threshold value and a lower overload level threshold value in association with each of the plurality of overload level values, in which the upper overload level threshold value of a lesser overload level value slightly overlaps the lower overload level threshold value of a higher overload level value, whereby such overlap dampens behavior of the method;

storing a plurality of rejection proportion values in the memory, wherein each rejection proportion value is associated with one of the overload level values;

determining the current saturation level of the node; and rejecting a quantity of messages received at the node equal to the rejection proportion value associated with one of the upper and lower overload level values that corresponds to the current saturation level.

2. A method for reducing an overload condition at a node of a communication system, comprising the steps of:

storing a plurality of upper and lower overload level values in a memory, wherein each upper and lower overload level value corresponds to a saturation condition of the node;

storing a plurality of rejection proportion values in the memory, wherein each rejection proportion value is associated with one of the overload level values;

determining the current saturation level of the node;

rejecting a quantity of messages received at the node equal to the rejection proportion value associated with one of the upper and lower overload level values that corresponds to the current saturation level, including rejecting every nth call initialization message received at the node, in which n is a rejection value associated with an overload level value that is exceeded;

wherein the node is a call processor and the messages received at the node are call initialization messages that represent requests to the call processor to process a new call;

receiving the message at an interface having a message queue;

determining a current saturation level of the message queue; and storing the message in the message queue when the message is not rejected;

storing a rejection threshold value m in the memory in association with a loading level of a processor of the call processor;

receiving one or more messages from the message queue at the processor; and rejecting every mth message received at the processor when the loading level of the processor exceeds a predetermined maximum loading level.

3. The method recited in claim 2, in which the step of rejecting comprises the step of:

rejecting every mth call initialization message received at the processor when the loading level of the processor exceeds the predetermined maximum loading level.

4. A method for reducing overloading of a call processor in a telecommunications network, comprising the steps of:

storing a plurality of pairs of upper and lower overload level values in a memory of the call processor, wherein each pair of upper and lower overload level values corresponds to a saturation condition of the call processor, including storing a plurality of message queue values that each represent an amount of occupied storage within a message queue;

storing a plurality of rejection proportion values in the memory, wherein each rejection proportion value is associated with one of the pairs of overload level values;

receiving call initialization messages at a message queue of an interface of the call processor determining when a current saturation level of the call processor exceeds one of the plurality of overload values, including determining when a current storage level of the message queue exceeds one of the message queue values; and rejecting a proportion of the call initialization messages received at the call processor equal to the rejection proportion values associated with that pair of overload level values that corresponds to the current saturation level, and in which each call initialization message is a request to the call processor to process a new call for the telecommunications system.

5. A method for reducing overloading of a call processor in a telecommunications network, comprising the steps of:

storing a plurality of pairs of upper and lower overload level values in a memory of the call processor, wherein each pair of upper and lower overload level values corresponds to a saturation condition of the call processor, including storing a plurality of processor load values that each represent an amount of processor usage loading;

storing a plurality of rejection proportion values in the memory, wherein each rejection proportion value is associated with one of the pairs of overload level values;

receiving call initialization messages at a central processor of an interface of the call processor determining when a current saturation level of the call processor exceeds one of the plurality of overload values, including determining when a current processor load of the central processor exceeds one of the processor load values; and rejecting a proportion of the call initialization messages received at the call processor equal to the rejection proportion values associated with that pair of overload level values that corresponds to the current saturation level, and in which each call initialization message is a request to the call processor to process a new call for the telecommunications system.

6. A computer readable medium carrying one or more sequences of instructions for reducing an overload condition at a node of a communication system, wherein execution of the one or more sequences of instructions by one or more processors causes the one or more processors to perform the steps of:

storing a plurality of upper and lower overload level values in a memory, wherein each upper and lower overload level value corresponds to a saturation condition of the node;

storing a plurality of rejection proportion values in the memory, wherein each rejection proportion value is associated with one of the overload level values;

determining the current saturation level of the node;

rejecting a quantity of messages received at the node equal to the rejection proportion value associated with one of the upper and lower overload level values that corresponds to the current saturation level;

identifying a message type of the message received at the node;

determining whether the message type is a first type that can be rejected or a second type that cannot be rejected; and rejecting only messages of the first type.

7. A computer readable medium carrying one or more sequences of instructions for reducing an overload condition at a node of a communication system, wherein execution of the one or more sequences of instructions by one or more processors causes the one or more processors to perform the steps of:

storing a plurality of upper and lower overload level values in a memory, wherein each upper and lower overload level value corresponds to a saturation condition of the node;

storing a plurality of rejection proportion values in the memory, wherein each rejection proportion value is associated with one of the overload level values;

determining the current saturation level of the node;

rejecting a quantity of call initialization messages received at the node equal to the rejection proportion value associated with one of the upper and lower overload level values that corresponds to the current saturation level, including rejecting every nth call initialization message received at the node, in which n is a rejection value associated with an overload level value that is exceeded.

8. The method of claim 7, wherein the node is a universal protocol converter.

9. A computer-readable medium carrying one or more sequences of instructions for reducing an overload condition at a node of a communication system, wherein execution of the one or more sequences of instructions by one or more processors causes the one or more processors to perform the steps of:

storing a plurality of upper and lower overload level values in a memory, wherein each upper and lower overload level value corresponds to a saturation condition of the node, and wherein the storing includes
storing an upper overload level threshold value and a lower overload level threshold value in association with each of the plurality of overload level values, in which the upper overload level threshold value of a lesser overload level value slightly overlaps the lower overload level threshold value of a higher overload level value, whereby such overlap dampens behavior of reducing the overload condition;
storing a plurality of rejection proportion values in the memory, wherein each rejection proportion value is associated with one of the overload level values;
determining a current saturation level of the node; and
rejecting a quantity of messages received at the node equal to a rejection proportion value associated with one of the upper and lower overload level values that corresponds to the current saturation level.

10. A computer-readable medium carrying one or more sequences of instructions for reducing an overload condition at a node of a communication system, wherein execution of the one or more sequences of instructions by one or more processors causes the one or more processors to perform the steps of:

storing a plurality of upper and lower overload level values in a memory, wherein each upper and lower overload level value corresponds to a saturation condition of the node;
storing a plurality of rejection proportion values in the memory, wherein each rejection proportion value is associated with one of the overload level values;
determining a current saturation level of the node;
rejecting a quantity of messages received at the node equal to a rejection proportion value associated with one of the upper and lower overload level values that corresponds to the current saturation level, including rejecting every nth call initialization message received at the node, in which n is a rejection value associated with an overload level value that is exceeded;
wherein the node is a call processor and the messages received at the node are call initialization messages that represent requests to the call processor to process a new call;
receiving a message at an interface having a message queue;
determining a current saturation level of the message queue; and
storing the message in the message queue when the message is not rejected;
storing a rejection threshold value m in the memory in association with a loading level of a processor of the call processor;
receiving one or more messages from the message queue at the processor; and
rejecting every mth message received at the processor when the loading level of the processor exceeds a predetermined maximum loading level.

11. The computer-readable medium recited in claim 10, in which the step of rejecting comprises the step of:

rejecting every mth call initialization message received at the processor when the loading level of the processor exceeds the predetermined maximum loading level.

12. A computer-readable medium carrying one or more sequences of instructions for reducing overloading of a call processor in a telecommunications network, wherein execution of the one or more sequences of instructions by one or more processors causes the one or more processors to perform the steps of:

storing a plurality of pairs of upper and lower overload level values in a memory of the call processor, wherein each pair of upper and lower overload level values corresponds to a saturation condition of the call processor, including
storing a plurality of message queue values that each represent an amount of occupied storage within a message queue;
storing a plurality of rejection proportion values in the memory, wherein each rejection proportion value is associated with one of the pairs of overload level values;
receiving call initialization messages at a message queue of an interface of the call processor;
determining when a current saturation level of the call processor exceeds one of the plurality of overload level values, including
determining when a current storage level of the message queue of the interface of the call processor exceeds one of the message queue values; and
rejecting a proportion of the call initialization messages received at the call processor equal to a rejection proportion value associated with that pair of overload level values that corresponds to the current saturation level, and in which each call initialization message is a request to the call processor to process a new call for the telecommunications network.

13. A computer-readable medium carrying one or more sequences of instructions for reducing overloading of a call processor in a telecommunications network, wherein execution of the one or more sequences of instructions by one or more processors causes the one or more processors to perform the steps of:

storing a plurality of pairs of upper and lower overload level values in a memory of the call processor, wherein each pair of upper and lower overload level values corresponds to a saturation condition of the call processor, including
storing a plurality of processor load values that each represent an amount of processor usage loading;
storing a plurality of rejection proportion values in the memory, wherein each rejection proportion value is associated with one of the pairs of overload level values;
receiving call initialization messages at a central processor of an interface of the call processor;
determining when a current saturation level of the call processor exceeds one of the plurality of overload levels values, including
determining when a current processor load of the central processor exceeds one of the processor load values; and
rejecting a proportion of the call initialization messages received at the call processor equal to a rejection proportion values associated with that pair of overload level values that corresponds to the current saturation level, and in which each call initialization message is a request to the call processor to process a new call for the telecommunications network.

14. A system for reducing an overload condition at a node of a communication system, the system comprising:
- means for storing a plurality of upper and lower overload level values in a memory, wherein each upper and lower overload level value corresponds to a saturation condition of the node, and wherein the means for storing includes
  - means for storing an upper overload level threshold value and a lower overload level threshold value in association with each of the plurality of overload level values, in which the upper overload level threshold value of a lesser overload level value slightly overlaps the lower overload level threshold value of a higher overload level value, whereby such overlap dampens behavior of the system;
- means for storing a plurality of rejection proportion values in the memory, wherein each rejection proportion value is associated with one of the overload level values;
- means for determining a current saturation level of the node; and
- means for rejecting a quantity of messages received at the node equal to a rejection proportion value associated with one of the upper and lower overload level values that corresponds to the current saturation level.

15. A system for reducing an overload condition at a node of a communication system, the system comprising:
- means for storing a plurality of upper and lower overload level values in a memory, wherein each upper and lower overload level value corresponds to a saturation condition of the node;
- means for storing a plurality of rejection proportion values in the memory, wherein each rejection proportion value is associated with one of the overload level values;
- means for determining a current saturation level of the node;
- means for rejecting a quantity of messages received at the node equal to a rejection proportion value associated with one of the upper and lower overload level values that corresponds to the current saturation level, including
  - means for rejecting every nth call initialization message received at the node, in which n is a rejection value associated with an overload level value that is exceeded;
- wherein the node is a call processor and the messages received at the node are call initialization messages that represent requests to the call processor to process a new call;
- means for receiving a message at an interface having a message queue;
- means for determining a current saturation level of the message queue; and
- means for storing the message in the message queue when the message is not rejected;
- means for storing a rejection threshold value m in the memory in association with a loading level of a processor of the call processor;
- means for receiving one or more messages from the message queue at the processor; and
- means for rejecting every mth message received at the processor when the loading level of the processor exceeds a predetermined maximum loading level.

16. A system for reducing overloading of a call processor in a telecommunications network, the system comprising:
- means for storing a plurality of pairs of upper and lower overload level values in a memory of the call processor, wherein each pair of upper and lower overload level values corresponds to a saturation condition of the call processor, including
  - means for storing a plurality of message queue values that each represent an amount of occupied storage within a message queue;
- means for storing a plurality of rejection proportion values in the memory, wherein each rejection proportion value is associated with one of the pairs of overload level values;
- means for receiving a call initialization messages at a message queue of an interface of the call processor;
- means for determining when a current saturation level of the call processor exceeds one of the plurality of overload values, including
  - means for determining when a current storage level of the message queue of the interface of the call processor exceeds one of the message queue values; and
- means for rejecting a proportion of the call initialization messages received at the call processor equal to a rejection proportion value associated with that pair of overload level values that corresponds to the current saturation level, and in which each call initialization message is a request to the call processor to process a new call for the telecommunications network.

17. A system for reducing overloading of a call processor in a telecommunications network, the system comprising:
- means for storing a plurality of pairs of upper and lower overload level values in a memory of the call processor, wherein each pair of upper and lower overload level values corresponds to a saturation condition of the call processor, including
  - means for storing a plurality of processor load values that each represent an amount of processor usage loading;
- means for storing a plurality of rejection proportion values in the memory, wherein each rejection proportion value is associated with one of the pairs of overload level values;
- means for receiving call initialization messages at a central processor of an interface of the call processor;
- means for determining when a current saturation level of the call processor exceeds one of the plurality of overload values, including
  - means for determining when a current processor load of the central processor exceeds one of the processor load values; and
- means for rejecting a proportion of the call initialization messages received at the call processor equal to a rejection proportion value associated with that pair of overload level values that corresponds to the current saturation level, and in which each call initialization message is a request to the call processor to process a new call for the telecommunications network.

18. A system for reducing an overload condition at a node of a communication system, the system comprising:
- means for storing a plurality of upper and lower overload level values in a memory, wherein each upper and lower overload level value corresponds to a saturation condition of the node;
- means for storing a plurality of rejection proportion values in the memory, wherein each rejection proportion value is associated with one of the overload level values;

means for determining the current saturation level of the node;

means for rejecting a quantity of messages received at the node equal to a rejection proportion value associated with one of the upper and lower overload level values that corresponds to the current saturation level;

means for identifying a message type of a message received at the node;

means for determining whether the message type is a first type that can be rejected or a second type that cannot be rejected; and means for rejecting only messages of the first type.

19. A system for reducing an overload condition at a node of a communication system, the system comprising:

means for storing a plurality of upper and lower overload level values in a memory, wherein each upper and lower overload level value corresponds to a saturation condition of the node;

means for storing a plurality of rejection proportion values in the memory, wherein each rejection proportion value is associated with one of the overload level values;

means for determining a current saturation level of the node;

means for rejecting a quantity of call initialization messages received at the node equal to a rejection proportion value associated with one of the upper and lower overload level values that corresponds to the current saturation level, including means for rejecting every nth call initialization message received at the node, in which n is a rejection value associated with an overload level value that is exceeded.

* * * * *